United States Patent
Chen et al.

(10) Patent No.: US 7,753,119 B2
(45) Date of Patent: *Jul. 13, 2010

(54) IN-SITU HEAVY-OIL RESERVOIR EVALUATION WITH ARTIFICIAL TEMPERATURE ELEVATION

(75) Inventors: Songhua Chen, Katy, TX (US); Daniel T. Georgi, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 1863 days.

This patent is subject to a terminal disclaimer.

(21) Appl. No.: 10/818,873

(22) Filed: Apr. 6, 2004

(65) Prior Publication Data

US 2004/0188140 A1 Sep. 30, 2004

Related U.S. Application Data

(63) Continuation of application No. 10/223,177, filed on Aug. 19, 2002, now Pat. No. 6,755,246.

(60) Provisional application No. 60/313,174, filed on Aug. 17, 2001.

(51) Int. Cl.
*E21B 49/00* (2006.01)
*G01V 3/00* (2006.01)

(52) U.S. Cl. .............. 166/250.1; 166/250.01; 166/250.02; 166/253.1; 166/272.1; 166/264; 166/248; 324/303

(58) Field of Classification Search ............. 166/264, 166/250.01, 250.02; 324/303
See application file for complete search history.

(56) References Cited

U.S. PATENT DOCUMENTS

| | | | | |
|---|---|---|---|---|
| 4,052,662 | A | 10/1977 | Rau | 324/6 |
| 4,595,878 | A * | 6/1986 | Bradshaw | 324/300 |
| 4,893,084 | A | 1/1990 | Rau | 324/341 |
| 5,109,853 | A | 5/1992 | Taicher et al. | 128/653.2 |
| 5,303,775 | A | 4/1994 | Michaels et al. | 166/264 |
| 5,325,918 | A | 7/1994 | Berryman et al. | 166/248 |
| 5,377,755 | A | 1/1995 | Michaels et al. | 166/264 |
| 5,712,566 | A | 1/1998 | Taicher et al. | 324/303 |
| 5,811,973 | A | 9/1998 | Meyer, Jr. | 324/338 |
| 6,247,542 | B1 | 6/2001 | Kruspe et al. | 175/40 |
| 6,755,246 | B2 * | 6/2004 | Chen et al. | 166/250.01 |

OTHER PUBLICATIONS

J.R. Fanchi et al.; *Feasibility of Reservoir Heating by Electromagnetic Irradiation*, SPE 20483, 65th Annual Technical Conference and Exhibition of the Society of Petroleum Engineers, Sep. 23-26, 1990, pp. 189-200, 1 Table, 7 Figs.

* cited by examiner

*Primary Examiner*—Louis M Arana
(74) *Attorney, Agent, or Firm*—Mossman Kumar & Tyler PC

(57) ABSTRACT

Many reservoirs of interest include heavy oil. In such reservoirs, partly at normal temperatures, many instruments commonly used for formation evaluation may not be able to distinguish between heavy oil and bound water in the formation. Passive or active heating is used to elevate the temperature of the fluids in the formation. At elevated temperatures, distinguishing between heavy oil and bound water is easier. Of particular interest is the increase in the resolvability of the transverse relaxation time $T_2$ of NMR spin echo measurements. Additionally, the dielectric constant and the loss tangents of water and heavy oil show different temperature and frequency dependence.

15 Claims, 3 Drawing Sheets

IN-SITU HEAVY-OIL RESERVOIR EVALUATION WITH ARTIFICIAL TEMPERATURE ELEVATION

CROSS REFERENCES TO RELATED APPLICATIONS

This application is a continuation of U.S. patent application Ser. No. 10/223,177 filed on Aug. 19, 2002, now U.S. Pat. No. 6,755,246, which claimed priority from U.S. Provisional Patent Application Ser. No. 60/313,174 filed on 17 Aug. 2001.

BACKGROUND OF THE INVENTION

1. Field of the Invention

The invention is in the field of wellbore logging devices. Specifically, the invention is a method of heating the rock formation to improve the quality of data about rock formations in nuclear magnetic resonance techniques for determining relaxation rates, loss tangent measurements, or in sampling of formation fluids as is done with a fluid sampling device. A suitable fluid sampling device is that used by Baker Hughes in conjunction with services provided under the mark RCI$^{SM}$ for formation fluid testing. This includes pressure, temperature, resistivity, capacitance and NMR sensors.

2. Description of the Related Art

Almost all the current well-logging instruments are designed to detect the in-situ fluid and/or formation properties without deliberately altering the environmental states, such as temperature, pressure, etc, of the formation and fluids. In principle, keeping the formation and fluids in their native state is a desirable choice in normal situations. However, because a tool is more sensitive to operation under certain conditions, there are situations where the quality of the measurements will improve if one changes the environmental state of the formation and fluids. As long as the modification does not create adverse effects on the subject formation and fluids, and as long as the change of environment is reversible after the means of modification is removed, measurements taken at the modified state are also valid, and experiments can be designed to be taken at the more favorable, altered state of the formation. This invention disclosure is about designing a tool which changes the environment and makes subsequent measurements, resulting in a more effective characterization of formation properties. Moreover, certain practices such as the heat produced by drilling change the environment temporarily. If an instrument response is more sensitive at a higher temperature, it will be desirable to measure the properties before the drilling induced heat is dissipated. It may also be beneficial to make measurements at different temperatures.

Many petroleum reservoirs in Canada, Venezuela, China, and other countries contain highly viscous oils. Most of the heavy-oil reservoirs are relatively shallow subsurface ones, where the formation water is often fresh, i.e., low in salinity. The lack of conductivity contrast between fresh water and hydrocarbon makes it difficult to quantify hydrocarbon saturations using the resistivity-based and induction-based logging techniques.

NMR and dielectric-based techniques are fundamentally different in the identification of fluid types and quantification of saturations; thus, they are complementary to resistivity-based technique. However, heavy oils present challenges in current NMR logging techniques. The state-of-art NMR logging tool can distinguish water (wetting phase) and hydrocarbon (non-wetting phase) only if their corresponding intrinsic and/or apparent relaxation times pose a significant contrast between the two types of reservoir fluids.

NMR responses are different, depending on whether the reservoir fluids are inside porous rocks or outside. For bulk, liquid-phase fluids, NMR response depends on viscosity and temperature:

$$T_{1bulk} \text{ or } T_{2bulk} = \frac{A \cdot T}{T_0 \cdot \eta}, \quad \text{Eq. (1)}$$

where A is a fluid-type dependent quantity and differs by a factor of about 2-3 between oil and water, T and $T_0$ are the absolute temperatures in Kelvin at reservoir and ambient conditions, respectively, and $\eta$ is the viscosity in cP. For water at room temperature, $\eta \approx 1$ cP. On the other hand, heavy oil viscosity is typically two (or more) orders of magnitude higher than that of water in a same temperature.

Although the bulk fluid relaxation time contrast appears useful in distinguishing heavy oil from bulk water, it may not be so useful if the fluids are inside porous rocks. In a rock, one must take into account additional relaxation mechanism arising from the interaction between pore surface and fluids in the pore:

$$T_1^{-1} = T_{1bulk}^{-1} + \rho \frac{S}{V} \quad \text{Eq. (2)}$$

$$T_2^{-1} = T_{2bulk}^{-1} + \rho \frac{S}{V}$$

where S/V is the pore-surface-to-pore-volume ratio and $\rho$ is the surface relaxivity which depends strongly on the wetting characteristics between the fluid and surface of pores. Depending on how large the relaxivity value, $\rho$, is, the apparent relaxation times could be either dominated by the bulk ($1^{st}$ term in eq. (2)) or surface ($2^{nd}$ term in eq. (2)) relaxation rate. For the majority of reservoirs, water is the wetting phase and oil is the non-wetting one. In this case, the apparent relaxation time of water is dominated by the surface relaxation mechanism, resulting in a much faster apparent relaxation decay than its bulk relaxation produces. Because the surface relaxation time term depends on S/V, the apparent relaxation time is even shorter for smaller sized pores and clays. The water in the smaller pores and clays often associates with water that is irreducible, often known as BVI (Bound Volume Irreducible) and CBW (Clay Bound Water). Although the mechanism for shortening the apparent relaxation times are different for heavy oil and CBW and BVI water, the result is that they overlap each other, and it is often difficult to separate heavy oil from these irreducible water by the difference of their relaxation times.

For most viscous oils, the intrinsic $T_2$ is too short for most NM logging tools to detect. The failure to detect these fastest decaying $T_2$ components results in an underestimation of the porosity of the oil-bearing formation. As can be seen from eq. (1), the relaxation times of oils are proportional to temperature. The viscosity, on the other hand, decreases with temperature. Thus, the relaxation time increases with temperature in the rate higher than linear temperature dependence. As most of the heavy oil reservoirs are shallow, the reservoir temperature is low. For example, a significant amount of heavy oil such as the Athabasca tar sands of Canada and the tar deposits of the Orinoco delta in Venezuela occur at shallow depths. For those reservoirs, underestimation of porosity for the viscous oil sands is highly likely.

Raising temperature can increase relaxation time $T_2$, making the otherwise undetected viscous components detectable, thus rectifying the porosity underestimation problem. On the other hand, the relaxation time of the wetting fluid phase, water, is dominated by surface relaxation, which is much less sensitive to temperature change. Therefore, the shift of $T_2$ towards the longer time alleviates the problem of identifying and quantification of heavy oil saturation from faster relaxing BVI and CBW components.

SUMMARY OF THE INVENTION

The present invention is a method of determining a parameter of interest of an earth formation or a fluid therein at two different times when the temperature and the parameter of interest are different When the formation fluid includes heavy oil and water, NMR devices have trouble distinguishing between heavy oil and bound water in the formation. By heating the formation (actively or passively), the temperature is changed. At elevated temperatures, the transverse relaxation time of heavy oil can be distinguished from that of in-situ water.

Because of the temperature gradient produced in the vicinity of the borehole by heating, use of a multiple frequency NMR device which detects signals at different depths from borehole walls for each frequency produces a profile of $T_2$ spectra; this is because the shift of oil relaxation-time components becomes a function of depth of investigation.

Another property that is temperature dependent is the dielectric constant. The loss tangent for water shows a significant temperature and frequency dependence and the dielectric contrast between hydrocarbon and water can be used to aid the discernment of oil and water saturations. Dielectric tools operate at quite different frequency bands than resistivity tools. A measure of the loss tangent shows a wide range of frequencies. For example, one measurement night be taken at 900 kHz while another is taken at 2.4 GHz.

DESCRIPTION OF PREFERRED EMBODIMENT

Figure 1A:
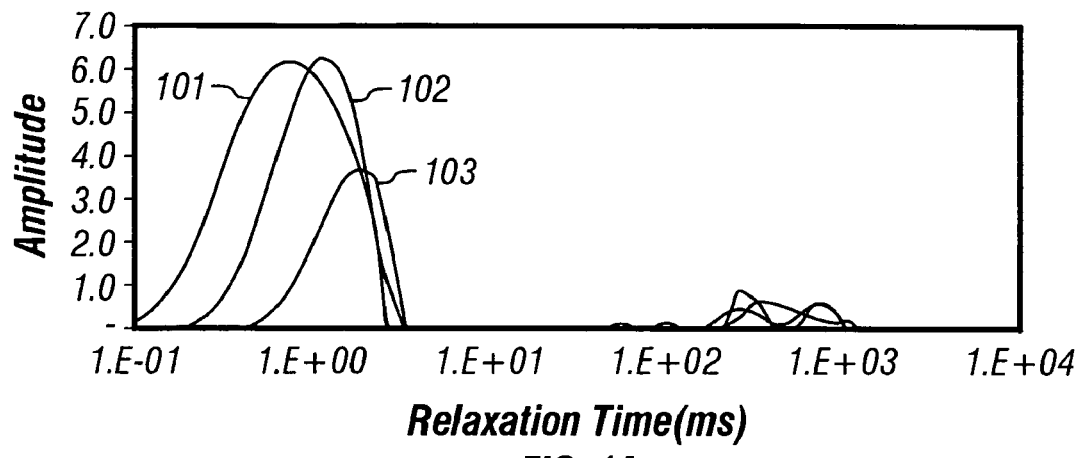
FIG. 1a is a graph of relaxation times, $T_2$, for crude oil measured with three different TE values (0.5, 1.2, 2.4 ms) at 30° C.

The present invention is an apparatus and a method that varies the temperature of the rock formation within a confined, local region adjacent to a borehole wall. Any one of many known devices for NMR measurements may be adapted for the present invention. For example, when making measurements while drilling, a modification of an apparatus such as that disclosed in U.S. Pat. No. 6,247,542 to Kruspe et al, the contents of which are fully incorporated herein by reference, may be used. When making NMR measurements with a wireline logging tool, a suitable apparatus is a modification of the device shown in U.S. Pat. No. 5,712,566 to Taicher et al, the contents of which are fully incorporated herein by reference. These particular patents have been cited only as examples of devices that may be modified in a straightforward manner as described below, and the present invention may be a modification of any suitable NMR logging device. In particular, for efficiency of heating, it is desirable to use a tool with a small-apertured NMR sensor. A feature that is common to all such suitable devices is a permanent magnet to provide a static magnetic field for polarizing spins of nuclei in a formation and an RF assembly for producing a pulsed RF field in the formation for excitation and detection of nuclear spin magnetic moments.

Separate embodiments of the invention are comprised of either active or passive mechanisms for heating the local volume of formation surrounding the borehole. Possible modifications of a basic NMR logging apparatus include a microwave heater proximate to the NMR assembly for heating the formation by irradiation with microwaves, or an inductive heating apparatus for heating the formation. For a very localized and small NMR sensor, another possible way of heating is by firing bullets into formation.

Passive methods include using the action of the drill tool, which produces heat, mainly from friction, to raise the local temperature in the rock formation. In current drilling processes, the dissipation of heat is hastened by effectively circulating the drilling mud. This cooler mud flows through the drill string and is injected on the drill bits; the wasted, hotter mud in brought out through the wellbore. The temperature of incoming circulating mud is lower than the formation temperature. If the circulation is effective, the temperature of the outgoing mud is higher than the incoming mud. However, for deep wells, the formation temperature may be still higher than the outgoing mud temperature, resulting in cooling the near borehole formation. For instance, in average Gulf of Mexico wells, the circulation bottom hole temperature (BHT) may be about 90° F. above static BHT for depths over 10,000 ft.

However, for shallow wells, where most of the world's heavy oil reserves exist, the circulation BHT is close to static BHT. Therefore, if the mud circulation rate is controlled such that the heat is dissipated sufficiently slowly, the circulated mud in the wellbore actually heats the formation, NMR measurements may be taken at the passively heated state. Such temperature control may be achieved by controlling the amount of thinning and/or gelling agents in the mud. Although it is desirable to operate the in a relatively cool state, due to the fact that the environment temperature for a shallow well is low (~40° C.), raising the temperature by 30-40° C. will not significantly degrade the drilling operation. Although thermal conductivity of the formation is not high, it is still suitable for the present invention since NMR measurements have a shallow-depth of investigation. To make use of passive heating, the NMR sensor is positioned close to the drillbit and measurements are made before the heat produced by drilling is substantially dissipated by drilling mud. Furthermore, additional measurements may be done at the equilibrium reservoir temperature, which may be accomplished on another trip using the same logging device.

In another embodiment using passive methods, a refrigerating device is used to cool mud that has been heated by the drilling process and the waste heat from the refrigerating device is transferred to a heat sink for heating the formation near an NMR sensor.

In another embodiment, the mud is heated from the surface mud pit and the heated mud is circulated Into the formation to raise the temperature near the wellbore. This method is practical for wells that are planned to use a geothermal source for heating the formation for recovery from viscous oil formations.

In one embodiment of the invention, a microwave device transfers electromagnetic energy from a microwave source to the formation, where the energy dissipates as heat. Microwave energy is generated in a frequency that does not change the chemical bonds in the organic constituency of crude oil. At a preferred frequency of up to 2,450 MHz, microwave energy leaves the chemical structures of the oil intact because there is no ionization, yet it creates molecular motion in the form of translation motion of the molecules and rotation of the dipoles.

The efficiency of the microwave absorption process is determined by several elements, including the size of the intended volume and dielectric losses due to both ionic conduction and dipolar rotation of the material in the formation rock and fluids. These individual dielectric loss rates are generally temperature-dependent but to different degrees. The loss due to dipolar rotation decreases with increasing temperature, while loss due to ionic conduction increases with increasing temperature. Composite loss rates are therefore dependent on the dominant loss mechanism within the formation. As an example, for low-temperature wells, the dipolar rotation mechanism is usually the dominant mechanism. In this case, the heating time depends on dielectric relaxation time.

For purposes of this invention, the rock formation outside a borehole is modeled as a dielectric medium with infinite extent. Hence, there are no boundaries that might produce a reflecting wave. In the embodiment using microwaves, as energy progresses into the medium, its amplitude diminishes owing to the absorption of power and conversion to heat. The penetration depth, defined as the depth into the formation at which the power flux has fallen to 1/e of its entry point value, is given by the formula $$D_p = \frac{\lambda_0}{2\pi\sqrt{2\varepsilon'}} \cdot \frac{1}{\sqrt{[1+(\varepsilon''/\varepsilon')]^2 - 1}} \approx \frac{\lambda\sqrt{\varepsilon'}}{2\pi\varepsilon''}$$

where $\lambda_0$ is the incident wavelength of the source, $\varepsilon'$ is the relative dielectric constant of the rock formation and $\varepsilon''$ is the relative dielectric loss factor.

The efficacy of temperature increase in the sensitive volume depends on the penetration of the microwave energy into the rock formation. Penetration depth depends on the operating microwave frequency and is different for rock matrices and types of fluids. Therefore, in rock formations, penetration depth depends on porosity and saturation. As an example, the microwave heating device can be operated at a frequency of 2,450 MHz and $\lambda_0$=12.24 cm at a temperature of 25° C. Under these conditions, the measured penetration depths of the energy into corn oil, water, mica, and sandy soil, respectively, are 0.022 m, 0.013 m, 0.253 m, and 4.446 m. Because water and oil generally coexist in the formation, the efficient heating of formation water and the heat conduction between local water and oil partially compensate for the relative inefficiency of dielectric heating of matrices and oil. Also, crude oils often contain conductive impurities which may increase the loss, and thus generate substantial heat. In rock formation where matrix volume is greater than pore volume, it is reasonable to expect an effective penetration depth of 7-10 cm. This depth is sufficient for borehole NMR measurements. Based on further experimentation on actual temperature dependence of properties of heavy oil, the expected depth of penetration may be different.

The requirements for heating power depends on the specific heats of the materials that constitute the fluid-bearing rock formation. As an example, the values of specific heat for water, crude oil, clay, limestone at room temperature are 4.2, 2.2, 1.0, and 0.92 kJ/kg/° C., respectively. For a 20% porosity rock, in which 80% of rock volume is matrix volume, the overall specific heat of formation is thus about 1.4 kJ/kg/K. Assuming an 8" borehole and a 1 kW directional, idealized microwave device such as an open waveguide with an aperture of 36° and further assuming the formation response to this microwave source has a penetration depth of $D_p$=2 to 4 inches, the rise in temperature over this volume ranges from 57 to 25° C./min. These values assume a density of formation $\rho_f$=2.34 kg/liter. Overall, power dissipation into the dielectric media is 64% of the incident power. Although power loss due to non-ideal microwave sources and conductive media need to be included for real situations, the heating time required for a small sensor is of the order of few minutes. This is acceptable for NMR logging or stationary measurements. Due to exponential temperature decay at distances away from the borehole wall, it is desirable to use multiple frequency NMR sensors which measure signals at different depths of investigation. For large apertured NMR sensors, usually a stationary measurement of a large heated area is more practical.

FIG. 1a shows the effect that changing the time interval between CPMG pulses, TE, has on the appearance time of the $T_2$ peak of crude oil at a temperature of 30° C. The peak for a pulse sequence with TE=0.5 ms (101) appears at 0.5 ms. At the same temperature, increasing the duration of the pulse sequence to TE=2.4 ms causes the $T_2$ peak to appear at 2 ms (103). It is important to note that the 2 ms peak of TE=2.4 ms is incorrect because little can be detected for porosity components having $T_2$<2 ms. This situation results in an underestimation of porosity and viscous oil saturation.

Figure 1B:
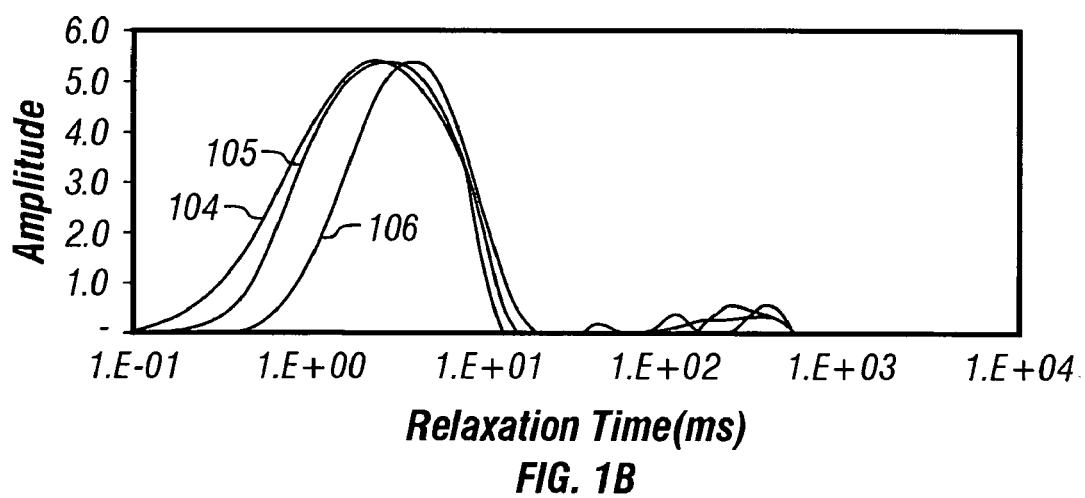
FIG. 1b is a graph of relaxation time, $T_2$, for crude oil measured with three different TE values (0.5, 1.2, 2.4 ms) at 75° C.

In FIG. 1b, the same pulse sequences are represented with the temperature now is raised to 75° C. At this temperature, the $T_2$ peak from a CPMG measurement with TE=0.5 ms now appears at approximately 2 ms (104). Furthermore, the peak of the response to the TE=2.4 ms sequence also occurs at approximately 2 ms (106). There is no discernable diminution of the peak at TE=2.4 ms, allowing the practitioner a more accurate reading of the porosity. FIGS. 1a and 1b show that changing the temperature of the environment can have a noticeable effect on the peak response readings.

Figure 2A:
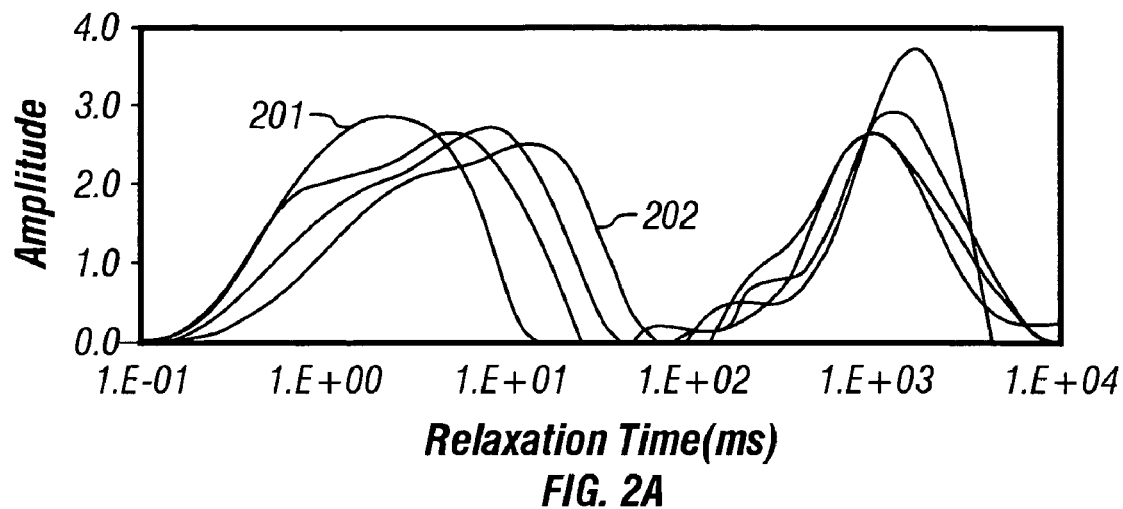
FIG. 2a is a graph of relaxation time, $T_2$, for crude oil measured at four different temperatures (30C, 45C, 60C, 75C) at a constant value of TE=0.5 ms.
Figure 2B:
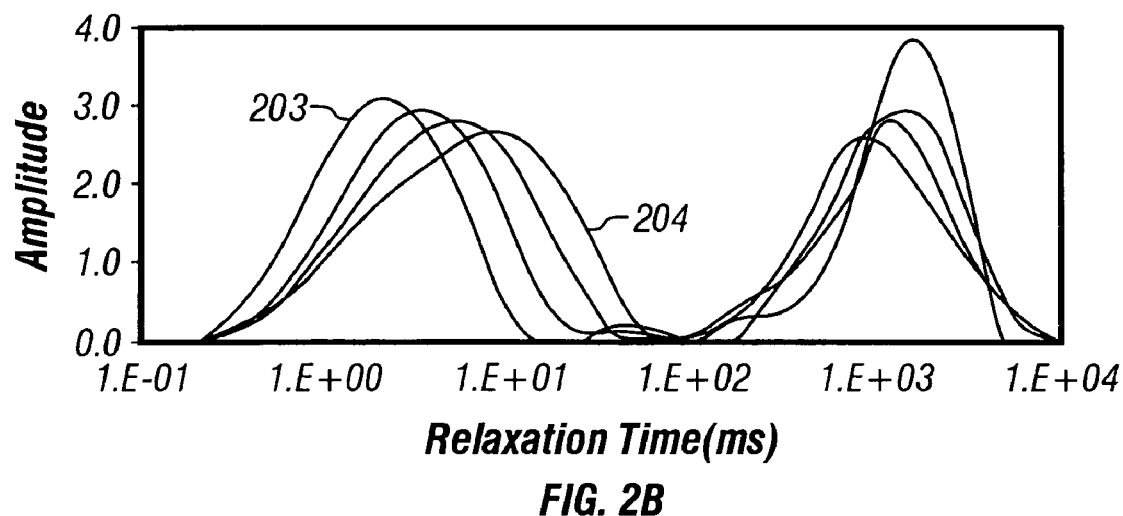
FIG. 2b is a graph of relaxation time, $T_2$, for crude oil measured at four different temperatures (30C, 45C, 60C, 75C) at a constant value of TE=1.2 ms.

The intrinsic relaxation time $T_2$ of oil, changes significantly depending on the temperature of the oil. Specifically, as temperature increases, the $T_2$ peak of heavy oil appears at later times. FIGS. 2a and 2b display the effect of heating on the $T_2$ distributions. This shift in the $T_2$ spectrum is expected to occur only for oil, due to the fact that for a water-wet system, the surface reflexivity is independent of temperature, meaning that a smaller shift is expected for the $T_2$ of water. Due to the diffusivity of water increasing with temperature, the diffusion effect tends to slightly shift the apparent $T_2$ to earlier times. Therefore increasing temperatures will shift the heavy oil to longer $T_2$ times and will shift the water to shorter $T_2$ time, facilitating the differentiation of oil and water NMR signals. The shift of water $T_2$ usually is insignificant for the faster decaying BVI and CBW water signal is dominated by surface relaxation. Furthermore, by comparing spectra acquired at different temperatures, the practitioner can identify and quantify oil and water saturation.

FIG. 2a shows the effects of temperature on the timing of the response peaks, with TE held constant at TE=0.5 ms. The curves represent readings taken at temperatures of 30° C., 45° C., 60° C., and 75° C. The peak for T=30° C. (201) occurs at approximately 2 ms. As temperature increases, the peak migrates to later times, such that the peak for T=75° C. (202) occurs at approximately 10 ms.

FIG. 2*b* shows the same experiment with the CPMG pulse interval maintained at TE=1.2 ms. As in FIG. 2*a*, temperature is changed from 30° C., 45° C., 60° C., and finally 75° C. As in FIG. 2*b*, the peak migrates to later times as temperature increases. At 30° C., the peak occurs at 2 ms (203), and at 75° C., the peak occurs at 10 ms (204). The examples shown in FIGS. 2*a* and 2*b* indicate that 40-50° C. temperature rise does make important differences for detecting heavy oils. Change from 2 ms to 10 ms clearly separates oil from CBW as the latter usually relaxes with $T_2 \leq 3$ ms.

The embodiment of the invention is designed to be operated in both single frequency mode or multiple frequency mode in order to obtain different types of information. In a single frequency mode, the practitioner can take NMR measurements indicative of porosity and saturation of heavy oils and interleave measurements with the microwave heating process to obtain temporal profiles of the NMR properties. Using a multiple frequency tool, the practitioner can obtain profiles of the $T_2$ spectrum and other NMR properties as a function of depth of sensitive volume (i.e., depth of investigation, DOI). Since the heating efficiency is depth dependent, the temperature is DOI dependent, and, thus, the depth profiles of the NMR response correspond to the temperature profile of the NMR response. On the other hand, another method for determining near-wellbore formation temperature is to use the existing arts of simulation techniques. For example, Fanchi in SPE Paper 20483 shows examples of temperature distribution in reservoirs heated by electromagnetic irradiation.

Principally any state-of-art NMR logging tools can be used in conjunction with the microwave heating device described in this invention. However, to heat a large volume in the formation usually requires longer times which may not be practical to logging applications. Therefore, a small apertured, preferably pad or side looking, NMR sensor focused in a small locality of formation is more desirable. A small sensor also reduces the power consumption thus leaving more power for microwave heating. A heated formation volume usually takes quite long time to cool down, therefore, for continuous logging while heating, a long-slit type of microwave antenna is placed in the front of the NMR device to provide pre-measurement heating of the formation.

The borehole fluid usually acts as a conductive media where microwave can be attenuated quickly. Thus, the microwave heating device is desired to have a good contact, or at least in a very close proximity, of the borehole wall.

In one embodiment of the invention, the microwave device used for heating is also used for determining dielectric properties of the earth formation, as the microwave frequency band is suitable for dielectric measurements. Oil saturation can potentially be determined by utilizing their differences between the loss tangents of oil (>1000e4) and water (<100e4). A noticeable difference appears in the imaginary component of the dielectric constants of each (80 for oil and 2 for water). The tan δ for water decrease as temperature increases. There is not enough current information on the temperature depend of tan δ for many types of oils. However, tan δ for water is also dependent on frequency. Measuring formation at two frequencies provides additional means to determine oil/water saturations.

Another embodiment of the invention uses the reservoir fluid characterization RCI™ tool of Baker Hughes Inc. at an increased temperature. Details of the operation of the tool are given, for example, in U.S. Pat. No. 5,377,755 and U.S. Pat. No. 5,303,775 to Michaels et al, having the same assignee as the present invention and which are fully incorporated herein by reference. Although the embodiment is not for use in close contact with the rock formation, due to significant microwave attenuation in water, the source of the microwaves must be placed in contact with the formation. In the RCI™ operation, reservoir fluids are extracted from formation using a pressure pump. Because of the low mobility of viscous oil, it requires very high pressure to extract viscous oils from formation, often in the risk of causing formation damage. When the local formation temperature is raised, the oil viscosity decreases. Thus, the reservoir fluids can be extracted under a reduced pumping pressure thereby reducing the risk of formation damage.

The data obtained at elevated temperature can be used in two ways. Firstly, for petrophysical quantities that are temperature independent, such as saturation and porosity, the estimated values obtained at the increased temperature should be the same as that in original reservoir temperature condition. For fluid properties that are temperature dependent, such as viscosity, the values obtained at the increased temperature are extrapolated back to its equilibrium reservoir temperature. Secondly, production of many heavy oil reservoirs requires the application of an enhanced oil recovery method because there is little spontaneous flow. The use of heating is one of the commonly used enhanced oil recovery methods. Oil properties measured at the increased temperature provide the exact information useful to predict the production potential if the enhanced oil recovery method is necessary.

Any of the described methods above (active or passive heating, refrigeration etc.) thus reversibly alters a property (temperature) of the formation. The alteration in temperature changes a parameter of interest that is measured by a sensing device within the formation. In broad terms, the present invention takes advantage of the difference in the parameter of interest.

Figure 3:
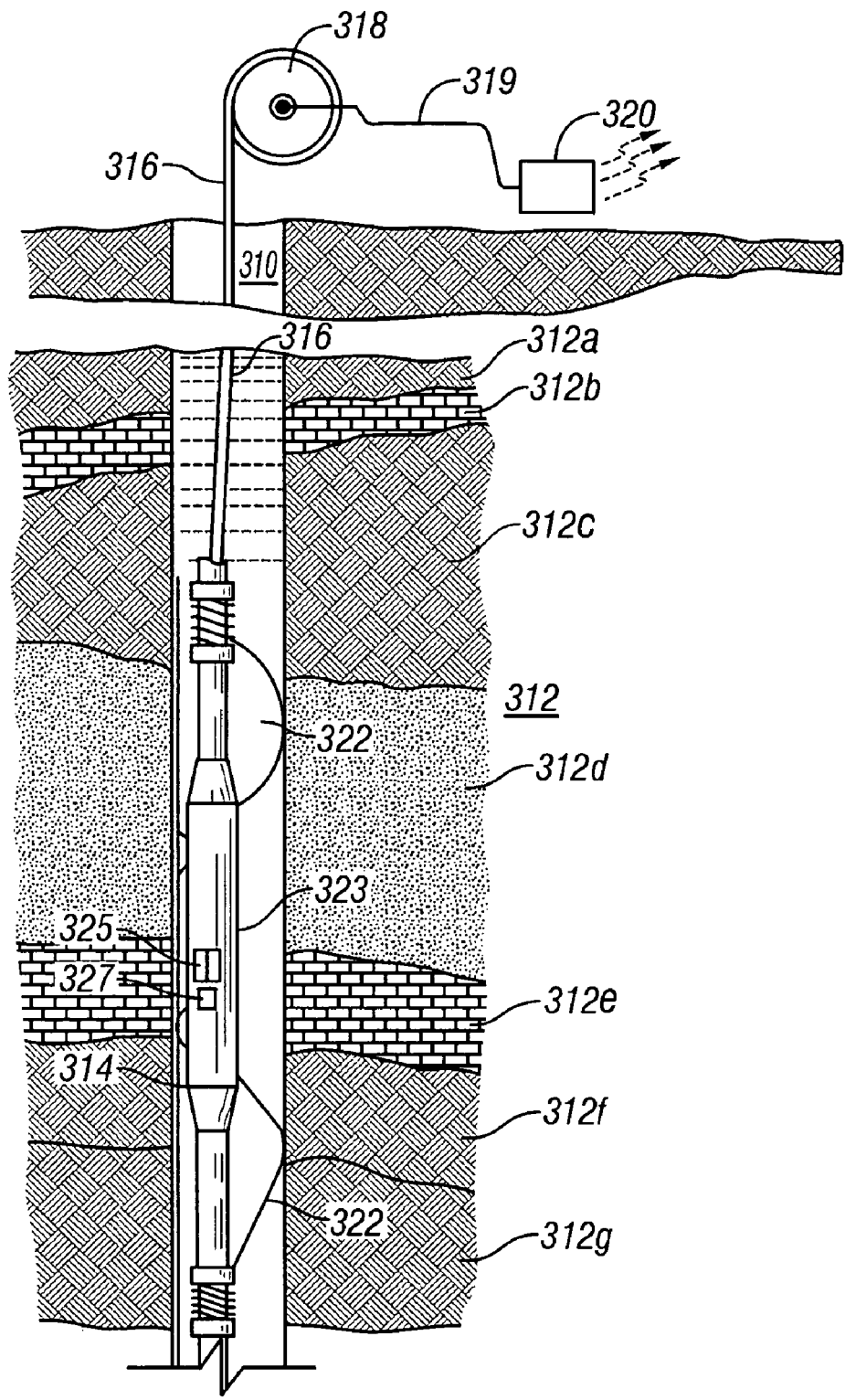
FIG. 3 shows an exemplary logging tool conveyed into a borehole.

FIG. 3 shows an exemplary tool suitable for use with the method of the present invention. Shown is a borehole 310 which has been drilled in a typical fashion into a subsurface geological formation 312 to be investigated for potential hydrocarbon producing reservoirs. A logging tool 314 has been lowered into the hole 310 by means of a cable 316 and appropriate surface equipment represented diagrammatically by a reel 318 and is being raised through the formation 312 comprising a plurality of layers 312*a* through 312*g* of differing composition, to log one or more of the formation's characteristics. The logging tool is provided with bowsprings 322 to maintain the tool in an eccentric position within the borehole with one side of the tool in proximity to the borehole wall. The logging tool 323 includes an NMR sensor 325 and a microwave heating device 327. In the example shown, the microwave heating device is shown below the NMR sensor. Alternatively, the microwave heating device may be placed above the NMR sensor. The latter arrangement is usually preferable wireline tools in which measurements are typically made with the wireline being pulled up from greater depths. The former arrangement (i.e., microwave heating device below the NMR sensor) is usually preferable in MWD applications.

As an alternative to or in addition to the NMR sensing device, dielectric measurements of the earth formation and/or fluids may be made by a suitable microwave sensing device (not shown). Exemplary tools and methods for determination of dielectric properties of earth formations are described in U.S. Pat. Nos. 4,052,662 and 4,893,084 to Rau, the contents of which are fully incorporated herein by reference. It should be noted that other microwave devices for determination of formation dielectric constant may also be used. It should also be noted that when a microwave sensing device is used, a heating device may not be necessary, i.e., the heating device and the sensing device may be the same.

Signals generated by the tool 314 are passed to the surface through the cable 316 and from the cable 316 through another line 319 to appropriate surface equipment 320 for processing, recording and/or display or for transmission to another site for processing, recording and/or display. It should also be noted that in FIG. 3, the NMR sensor and the microwave heating device are shown on a single tool. It is also possible to have them on different assemblies that can be strung together.

The present invention has been described with reference to a wireline device. However, the principles of the invention may also be embodied in and used with MWD devices conveyed on a drilling tubular such as a drillstring or coiled tubing.

While the foregoing disclosure is directed to the preferred embodiments of the invention, various modifications will be apparent to those skilled in the art. It is intended that all variations within the scope and spirit of the appended claims be embraced by the foregoing disclosure.

We claim:

1. An apparatus configured for use in a borehole in an earth formation, the apparatus comprising:
    a measurement device configured to be conveyed in the borehole and make a measurement indicative of a property of the earth formation at a first time; and
    a temperature modifying device configured to cause a change of temperature of the earth formation between said first time and a second time; wherein said measurement device is further configured to make a measurement indicative of the property of the earth formation at the second time.

2. The apparatus of claim 1 wherein said temperature modifying device comprises a source of mud configured to circulate mud into said borehole.

3. The apparatus of claim 1 wherein said temperature modifying device comprises a drillbit.

4. The apparatus of claim 1 wherein said temperature modifying device further comprises a heating device selected from the group consisting of (i) a microwave heating device, (ii) an induction heating device, (iii) a geothermal heating device, (iv) a mud-heating apparatus, or (v) refrigerator heater combination.

5. The apparatus of claim 1 wherein the temperature modifying device comprises a directional heating device.

6. The apparatus of claim 5 wherein the directional heating device comprises an open waveguide.

7. The apparatus of claim 1 wherein the property comprises a dielectric constant of a fluid in the formation and wherein the measurement device further comprises a microwave tool configured to provide a measurement indicative of the dielectric constant.

8. The apparatus of claim 1 wherein the measurement device is configured to make measurement responsive to a relaxation of nuclear magnetic spins of a fluid in the formation.

9. The apparatus of claim 8 wherein the fluid further comprises a heavy oil and wherein the measurement device is configured to make a measurement indicative of at least one of (i) porosity, (ii) clay bound water volume, (iii) irreducible water volume, (iv) a transverse relaxation time $T_2$ of the heavy oil, and, (v) a heavy oil saturation of the formation.

10. The apparatus of claim 8 wherein the measurement device is selected from: (i) a single frequency nuclear magnetic resonance (NMR) device, and (ii) a multiple frequency NMR device.

11. The apparatus of claim 1 wherein the measurement device is further configured to make at least one additional measurement at a third time different from the first and second times.

12. The apparatus of claim 1 wherein the measurement device is further configured to make a measurement indicative of an additional property of the earth formation at the first time and the second time, the additional property having substantially the same value at the first time and the second time.

13. The apparatus of claim 1 wherein the change in the property is used in an enhanced oil recovery operation.

14. A method of evaluating an earth formation, the method comprising:
    conveying a measurement device into a borehole;
    (b) causing an increase of temperature of the earth formation; recovering a sample of a formation fluid into a chamber on the measurement device after causing the increase in temperature; and
    measuring a property of the sample of formation fluid in the chamber.

15. The method of claim 14 wherein the measured property further comprises a viscosity, the method further comprising using the measured viscosity for evaluation of a production potential of the formation.

* * * * *